No. 857,694. PATENTED JUNE 25, 1907.
C. WAHNSIEDLER.
PIPE CUTTER.
APPLICATION FILED JULY 14, 1906.
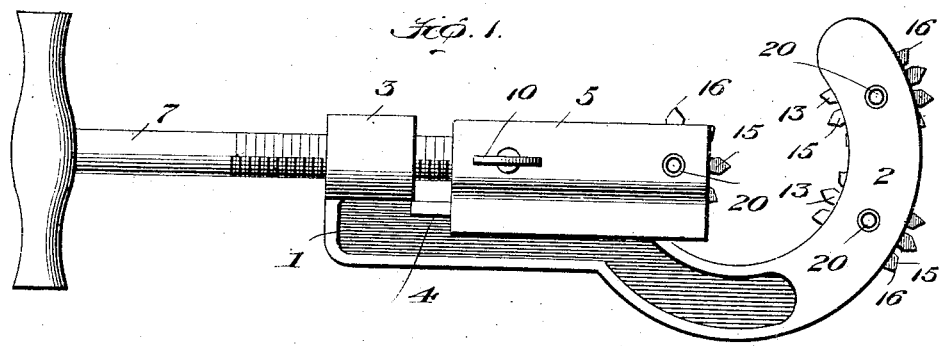
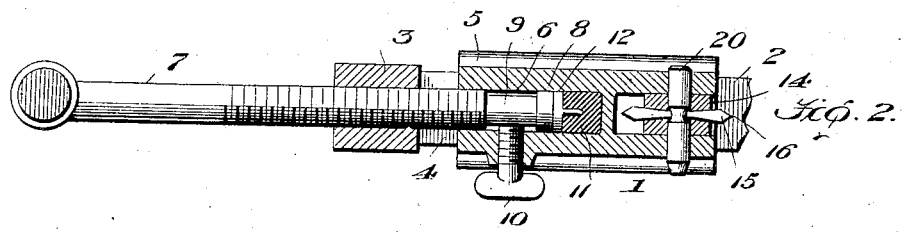
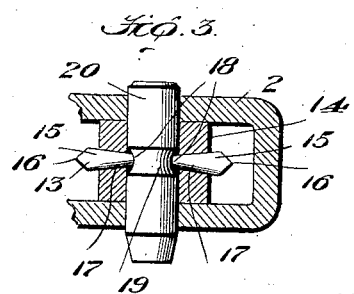
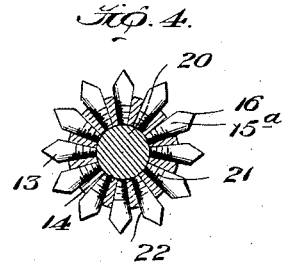
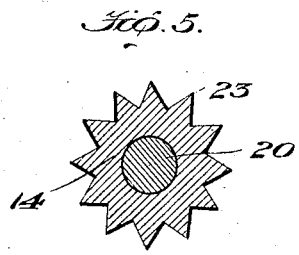
Witnesses
Inventor
Charles Wahnsiedler
By Frank C. Fore
his Attorney

UNITED STATES PATENT OFFICE.

CHARLES WAHNSIEDLER, OF EVANSVILLE, INDIANA.

PIPE-CUTTER.

No. 857,694.　　　　Specification of Letters Patent.　　　　Patented June 25, 1907.

Application filed July 14, 1906. Serial No. 326,210.

*To all whom it may concern:*

Be it known that I, CHARLES WAHNSIEDLER, a citizen of the United States, residing at Evansville, county of Vanderburg, and State of Indiana, have invented certain new and useful Improvements in Pipe-Cutters, of which the following is a specification.

My invention relates to pipe cutters.

Heretofore rotary cutters have been employed for cutting wrought iron pipes but cast iron pipes have had to be severed by using a file, punch or chisel which are tedious, expensive and unsatisfactory methods and tend to split or crack the pipe.

The object of the present invention is the provision of a novel rotary cutter whereby cast iron pipes may be rapidly, easily and inexpensively cut without danger of their being split, and cracked, or otherwise injured.

The invention may be carried out in different ways, the preferred ones of which are set forth fully hereinafter.

In the accompanying drawings:—Figure 1 is a side elevation of the complete invention; Fig. 2, a horizontal section; Fig. 3, a cross-section through the cutter; Fig. 4, a cross-section through the cutter where the pins have screw threaded shanks; and Fig. 5, a cross-section showing another modification of the cutter.

The frame 1 has a hook 2, and an integral internally screw-threaded sleeve 3 of ordinary construction. Slidable on a guide 4, forming part of the frame 1, is a slide block 5 which has an internal bore 6. A handled screw 7, which is threaded through the sleeve 3, has a smooth end 8 received in the bore 6 and provided with an annular groove 9 into which is received the tip of a set screw 10 carried by the block 5. Between the end of the bore and the end 8 of the screw 7 there is positioned a rubber block or cushion 11, an abutment cage 12 being interposed between block 11 and end 8.

The cutters 13, of which three are employed, are of similar construction. They have a hub 14 and pins 15 positioned radially therein. The tips 16 of the pins are conical and the shanks 17 are tapered and driven into radial tapered sockets in hub 14 with their inner ends 18 received in a circumferential groove 19 in the journal pin 20. The groove 19 is dished transversely. The pin 20 is first passed through the hub 14 and driven into the holes in the frame provided for its reception, the hub being free to rotate on the journal pin. The cutter pins 15 are then driven home. When it is desired to remove the pins 15 for any purpose, as when they become dull or need replacement, the pin 20 is driven lengthwise, whereupon the groove 19 by engagement with the ends 18, loosens all the pins 15.

In the modification shown in Fig. 4, the groove 19 is dispensed with and the pins 15ª are provided with screw-threaded shanks 21 screwed into radial sockets in the hub, said pins having flattened parts 22 for the application of a wrench in positioning or removing them. In Fig. 5, the hub itself is provided with integral points 23.

The cutter is used in the well known manner by applying the hook 2 to the pipe and rotating the entire device, the screw 7 being tightened as the work progresses. The hubs of the cutters rotate and the sharp points of the pins make a ring of dents or pin-pricks in the pipe. The operation may be continued until the pipe is entirely severed or it may be continued only far enough to so weaken the pipe that it may be broken apart where the cut has been made. When a slight projection existing on the pipe is struck, the cushion 11 permits the cutter to yield slightly, which prevents damage to the device.

While I have illustrated and described the invention in connection with a particular type of pipe cutter, I wish it understood that the invention is not thus limited in its uses as the cutters themselves may be used separately in other connections and the cushioning device is also susceptible of other uses.

Having thus described my invention, what I claim as new and desire to secure by Letters Patent, is:—

1. A rotary cutter comprising a hub and a plurality of cutter pins having sharpened outer ends and provided with tapered shanks driven in sockets in said hub, in combination with a journal pin passing through the hub and provided with means for loosening the shanks of said pins on movement of said journal pin.

2. In a pipe cutter, the combination with a frame to engage the pipe, of a slide-block movable on said frame and having an opening or recess, cutting means carried by said slide-block, an adjusting screw having an elongated grooved end received in the opening in said slide-block, a set screw carried by the slide-block whose tip is of considerably less width than the length of the groove aforesaid and received in the said grooved end of the screw, and a cushion located in said opening and interposed between said screw end and the slide-block, said relation of groove and screw tip permitting movement of the adjusting screw in relation to the set screw.

In testimony whereof, I hereunto affix my signature in presence of two witnesses.

CHARLES WAHNSIEDLER.

Witnesses:
 CHARLES WAHNSIEDLER, Jr.,
 OTTO KLEIN.